United States Patent [19]
Kuriki et al.

[11] Patent Number: 5,390,948
[45] Date of Patent: Feb. 21, 1995

[54] ACTIVE VEHICLE SUSPENSION SYSTEM AND A CONTROL METHOD THEREFOR

[75] Inventors: Nobuharu Kuriki; Seiji Osaki; Yoshiki Noro; Hideaki Shibue, all of Saitama, Japan

[73] Assignee: Honda Giken Kogyo Kabushiki Kaisha, Tokyo, Japan

[21] Appl. No.: 771,364

[22] Filed: Oct. 1, 1991

[30] Foreign Application Priority Data

Oct. 15, 1990 [JP] Japan .................. 2-275752

[51] Int. Cl.$^6$ .......................................... B60G 17/015
[52] U.S. Cl. .................. 280/707; 364/424.05
[58] Field of Search .......... 280/707, 714, DIG. 1, 280/708; 364/424.05

[56] References Cited

U.S. PATENT DOCUMENTS

| | | | |
|---|---|---|---|
| 4,215,403 | 7/1980 | Pollard et al. | 280/707 |
| 4,402,527 | 9/1983 | Kakahi et al. | 280/707 |
| 4,625,993 | 12/1986 | Williams et al. | 280/DIG. 1 |
| 4,746,143 | 5/1988 | Okamoto | 280/707 |
| 4,830,397 | 5/1989 | Watanabe | 280/707 |
| 4,924,393 | 5/1990 | Kurosawa | 280/707 |
| 4,934,732 | 6/1990 | Fukunaga | 280/714 |
| 5,071,159 | 12/1991 | Kamimura et al. | 280/DIG. 1 |

FOREIGN PATENT DOCUMENTS 193708 10/1985 Japan .................. 280/708
289419 12/1987 Japan .................. 280/708

*Primary Examiner*—Karin L. Tyson
*Attorney, Agent, or Firm*—Irving M. Weiner; Joseph P. Carrier; Pamela S. Burt

[57] ABSTRACT

In an active vehicle suspension system employing a spring and a hydraulic actuator for supporting a wheel relative to a vehicle body, a control unit actuates the actuator so as to cancel the force applied by the spring force of the spring and a damping force applied by the hydraulic actuator. This damping force is typically produced by the flow resistance which the hydraulic oil encounters in the hydraulic circuit. This control action is carried out according to a signal obtained by processing an output of a displacement sensor between the wheel and the vehicle body with a first-order lead filter circuit. Thus, the control action is based on a readily available and highly responsive detection signal, an accurate and stable vibration control of the sprung mass of the vehicle or the vehicle body is made possible. This control action may be combined with a conventional feedback control based on the acceleration of the sprung mass or the load acting between the suspension system and the vehicle body, and a low-pass filter which ensures the stability of the system even when the first-order lead filter circuit is used.

19 Claims, 5 Drawing Sheets

ACTIVE VEHICLE SUSPENSION SYSTEM AND A CONTROL METHOD THEREFOR

TECHNICAL FIELD

The present invention relates to an active vehicle suspension system having a spring for supporting primarily the sprung mass of a vehicle body and a hydraulic actuator for actively controlling the movement of the wheel relative to the vehicle body both disposed between the vehicle body and the wheel, and a method for controlling such an active vehicle suspension system.

BACKGROUND OF THE INVENTION

A number of active vehicle suspension systems have been proposed which actively control the relative movement between the wheel and the vehicle body by using a linear hydraulic actuator according to the road condition and the behavior of the vehicle body. One of such active vehicle suspension systems is disclosed in Japanese patent laid open publication (kokai) No. 62-289420 in which an actuator is provided in parallel with a conventional suspension spring consisting of a coil spring so that the vibrations of the unsprung mass may be absorbed by the suspension spring while the vibrations of the sprung mass are absorbed by the actuator.

In such a vehicle suspension system, the deformation of the coil spring obviously affects the movement of the sprung mass or the vehicle body. Further, the damping force due to the resistance to the flow of the hydraulic fluid in the hydraulic actuator, in particular the flow resistance at the hydraulic control valve adversely affects the capability of the hydraulic actuator to absorb the vibrations of the sprung mass.

As a control method for reducing the vibrations of the sprung mass due to such interferences, there is known the sky hook damper control in which the hydraulic damper produces a force proportional to the absolute vertical velocity of the sprung mass so that a hypothetical damper may be provided between a fixed point in the space and the sprung mass or the vehicle body. In this case, it is difficult to directly detect the absolute velocity of the vehicle body, and the actuator has to be controlled, in reality, according to a value obtained by integrating the vertical acceleration of the vehicle body. However, in a low frequency range of 1 Hz or lower, since the integrated value has a tendency to drift, the sky hook control becomes impractical. Therefore, in practice, the actuator is controlled according to a signal obtained by filtering the acceleration with a first-order delay circuit which can be expressed by a transfer function $1/(1+Ts)$ where T is a time constant. Therefore, the sky hook damper control does not exist in a low frequency range. If the time constant is increased in value to extend the sky hook damper control to a lower frequency range, the control action becomes increasingly unstable.

BRIEF SUMMARY OF THE INVENTION

In view of such problems of the prior art, a primary object of the present invention is to provide an active vehicle suspension system which can operate according to a relatively simply obtainable and responsive signal and achieve a high vibration control effect on the sprung mass of a vehicle.

A second object of the present invention is to provide an active vehicle suspension system which can favorable control the vibrations of the sprung mass of a vehicle without any unstable tendency.

A third object of the present invention is to provide a method for controlling such an active vehicle suspension system.

These and other objects of the present invention can be accomplished by providing an active vehicle suspension system, comprising: a spring interposed between a vehicle body and a wheel which is supported by the vehicle body in a vertically moveable manner; an actuator interposed between the vehicle body and the wheel in parallel with the spring; a stroke sensor for detecting a relative displacement between the wheel and the vehicle body; and a control unit for controlling the actuator so as to apply a force to the vehicle body, the force being substantially proportional to a signal obtained by processing an output of the stroke sensor with a first-order lead filter circuit.

Thus, a favorable vibration control of the sprung mass is made possible by producing a force with the actuator which cancels a spring force applied by the spring to the vehicle body and a damping force applied by the actuator to the vehicle body, and this is accomplished by using a relative displacement between the wheel and the vehicle body which is a highly responsive and readily available detection signal.

This control may be combined with a conventional feedback control for the sprung mass which may be based on the vertical acceleration of the vehicle body or the force acting between the suspension system and the vehicle body.

To ensure the stability of the control system in spite of the use of the first-order lead filter circuit, the system may further comprise low-pass filter means for removing a high frequency component from the force applied by the actuator to the vehicle body.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
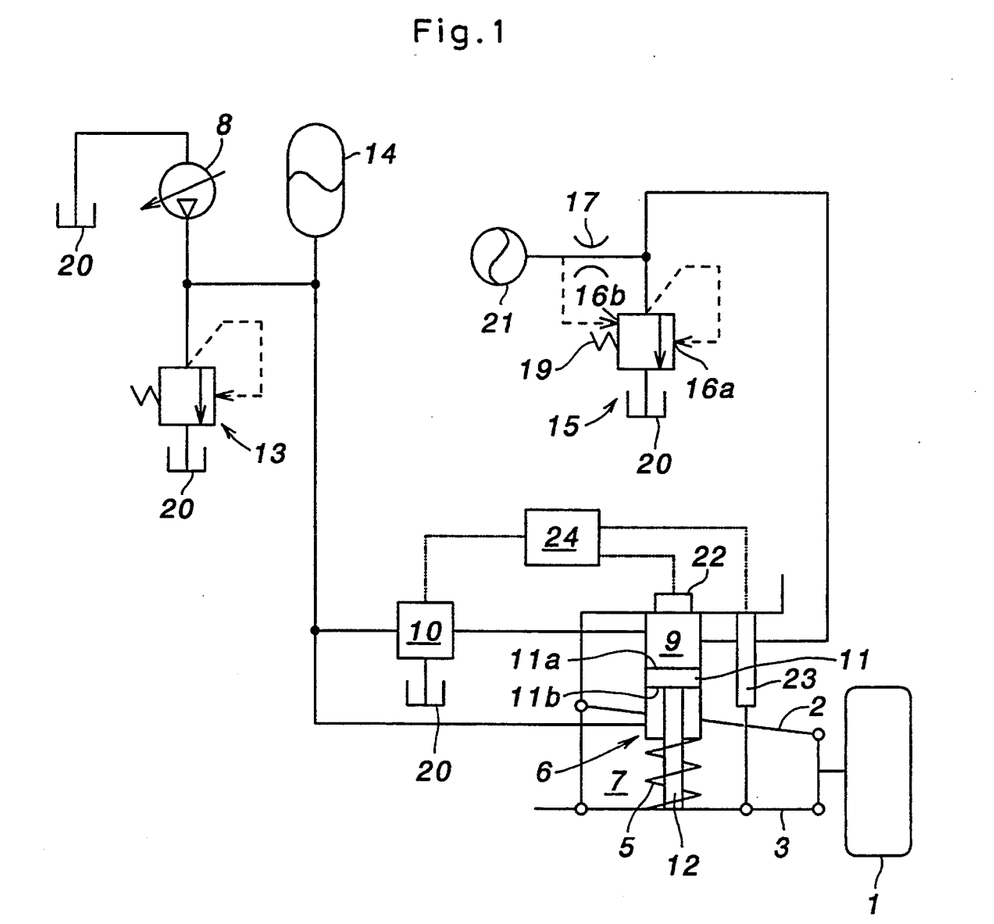
FIG. 1 is a schematic diagram of an embodiment of the active vehicle suspension system according to the present invention.

FIG. 1 illustrates the basic structure of an embodiment of the active vehicle suspension system according to the present invention. The wheel 1 of a vehicle is supported by the vehicle body 4 by means of a pair of vertically spaced suspension arms 2 and 3 in a vertically moveable manner. A compression coil spring 5 and a hydraulic actuator 6 are disposed between the lower suspension arm 3 and the vehicle body 4 in a mutually parallel relationship.

The hydraulic actuator 6 comprises a cylinder and a piston 11 received therein defining a lower chamber 7 which receives hydraulic oil directly from a variable capacity pump 8 and a lower chamber which receives hydraulic oil from the variable capacity pump 8 via a pressure regulating valve 10. The piston 11 is actuated according to the difference in the pressures applied to its upper and lower pressure receiving surfaces 11a and 11b. Since a piston rod 12 extends from the lower pressure receiving surface 11b out of the cylinder, the lower pressure receiving surface 11b is slightly smaller than the upper pressure receiving surface 11a.

The hydraulic oil supplied from the variable capacity pump 8 to the hydraulic actuator 6 is regulated at a fixed pressure level by a relief valve 13, and an accumulator 14 removes ripples of the pressure level. The pressure regulating valve 10 consists of a conventional linear solenoid valve which can continuously control the pressure supplied to the upper chamber 9 of the hydraulic actuator 6 in proportion to the magnitude of electric current supplied thereto.

A relief valve 15 is connected to the upper chamber 9 of the hydraulic actuator 6. This relief valve 15 consists of a poppet valve which receives the pressure of the upper chamber 9 at its first and second ports 16a and 16b, but the second port 16b is communicated with the upper chamber 9 via an orifice 17 whereas the first port 16a is directly communicated with the upper chamber 9. Therefore, when the difference in the pressures applied to the two ports of the poppet valve 15 exceeds a certain level determined by a coil spring 19 urging the poppet valve in the direction to close it, the oil pressure supplied to the first port 16a of the relief valve 15 or the pressure of the upper chamber 9 of the hydraulic actuator 6 is released to a reservoir tank 20 of the hydraulic oil.

Furthermore, an accumulator 21 is connected to the passage extending between the orifice 17 and the second port 16b for the purpose of reducing the transmissibility of the hydraulic pressure of the upper chamber 9 to the port 16b with an increase in the frequency. This accumulator 21 may be replaced with any suitable means which increases its capacity in proportion to the increase in pressure. For instance, the accumulator 21 may be omitted by forming the passage between the orifice 17 and the port 16b with flexible material.

This hydraulic relief circuit favorably absorbs the changes in the pressure of the upper chamber 9 exceeding a certain frequency and amplitude range.

The direction and pressure of the hydraulic oil supplied to the hydraulic actuator 6 may be controlled by the pressure regulating valve 10 according to control signals obtained from a load cell 22 provided between the hydraulic actuator 6 and the vehicle body 4 and a stroke sensor 23 provided between the vehicle body 4 and the wheel 1, and processed by a control circuit 24. Additionally, a vertical acceleration sensor 22′, may be provided on the vehicle body for use in a feedback circuit discussed further below.

Figure 2:
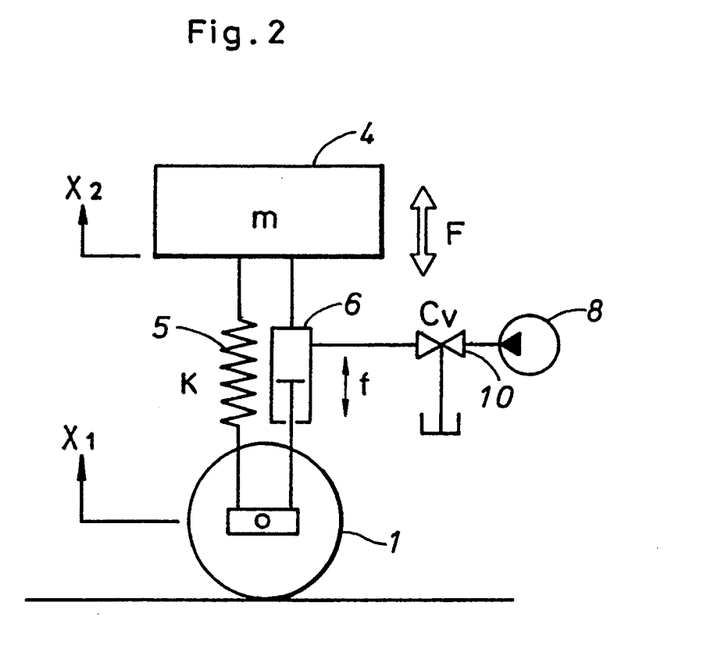
FIG. 2 is a schematic diagram showing an equivalent structure of the active vehicle suspension system of FIG. 1.

This vehicle suspension system can be represented by an equivalent model illustrated in FIG. 2 where m denotes a sprung mass, K denotes the spring constant of the coil spring 5 provided between the vehicle body 4 and the wheel 1, Cv denotes the damping coefficient of the pressure regulating valve 10, $X_1$ denotes the absolute position of the unsprung mass, $X_2$ denotes the absolute position of the sprung mass, F denotes the force acting on the sprung mass m (or the vehicle body 4), and f denotes the output force of the hydraulic actuator 6. Then, the motion of the sprung mass can be represented by the following equation of motion:

$$F = md^2X_2/dt^2$$
$$= -Cv(dX_2/dt - dX_1/dt) - K(X_2 - X_1) + f$$

Therefore, the force acting on the sprung mass m or F can be reduced to zero if $$f = K(X_2 - X_1) + Cv(dX_2/dt - dX_1/dt)$$

In reality, however, since the system will tend to be unstable if F is actually reduced to zero, the output force f of the hydraulic actuator 6 can be controlled by appropriately determining the coefficients corresponding to K and Cv so as to reduce F to zero in an approximate sense.

Figure 3:
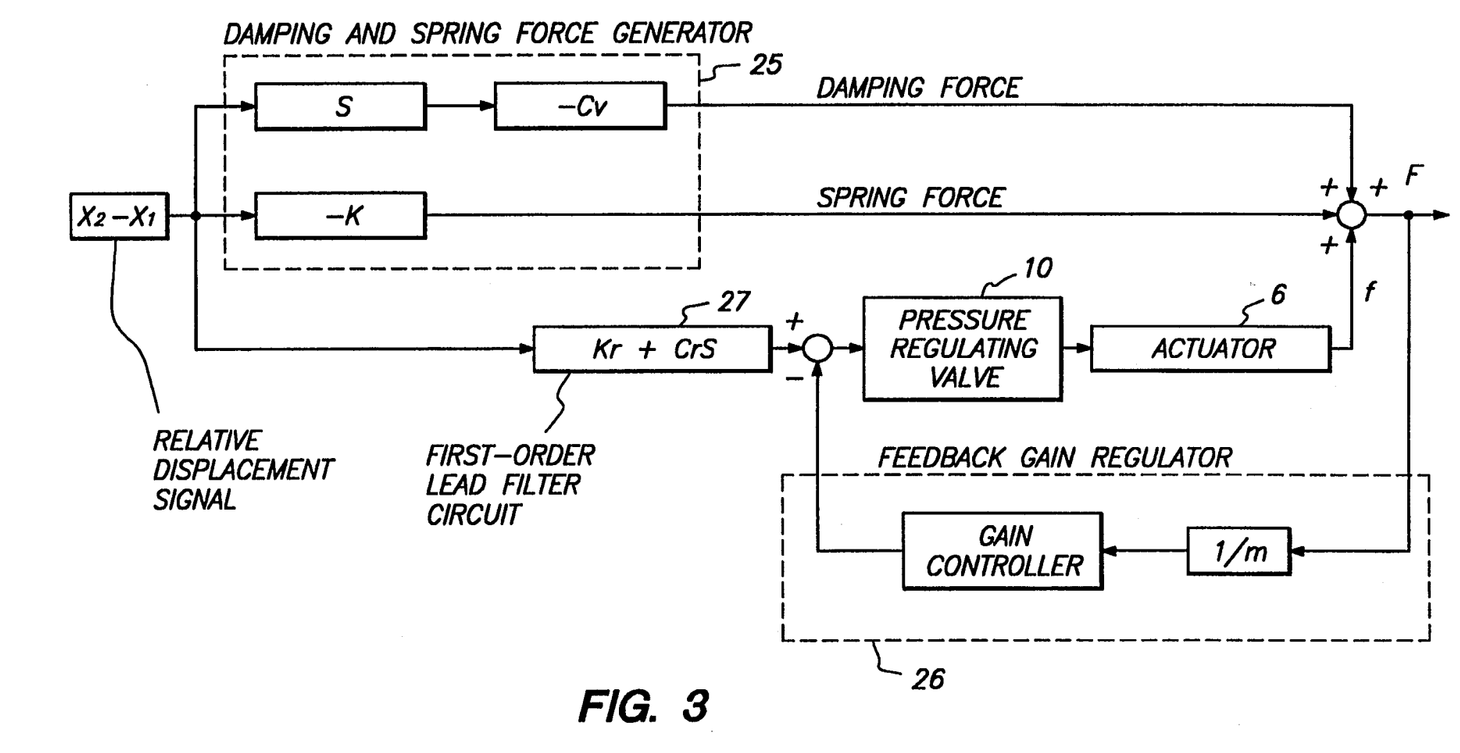
FIG. 3 is a block diagram of the control system of the active vehicle suspension system of FIG. 1.

The control process is described in the following with reference to the block diagram given in FIG. 3.

The part 25 surrounded by the one-dot chain line is related to the generation of the damping force—$Cv(dX_2/dt - dX_1/dt)$ by the pressure regulating valve 10 and the spring force—$K(X_2 - X_1)$ by the coil spring 5, and these forces may be considered as interferences to the sprung mass. Therefore, to the end of reducing the force F acting on the sprung mass m, it suffices to produce a force cancelling such interferences by using the hydraulic actuator 6.

The output control of the hydraulic actuator 6 is carried out by electrically detecting the relative displacement between the vehicle body 4 and the wheel 1 with the stroke sensor 23, and controlling the pressure regulating valve 10 according to a command signal obtained by processing the output $(X_2 - X_1)$ from the stroke sensor 23 with a first-order lead filter circuit 27 (Kr+Cr·s) having appropriate coefficients (Kr and Cr). Thus, the hydraulic actuator 6 produces a force f which cancels the damping force produced by the pressure regulating valve 10 and the spring force of the coil spring 5, and the vibration of the sprung mass can be effectively controlled. The first-order lead filter circuit 27 allows the system to be stable up to a control limit frequency which may be well above the frequency range of interest.

Figure 3A:
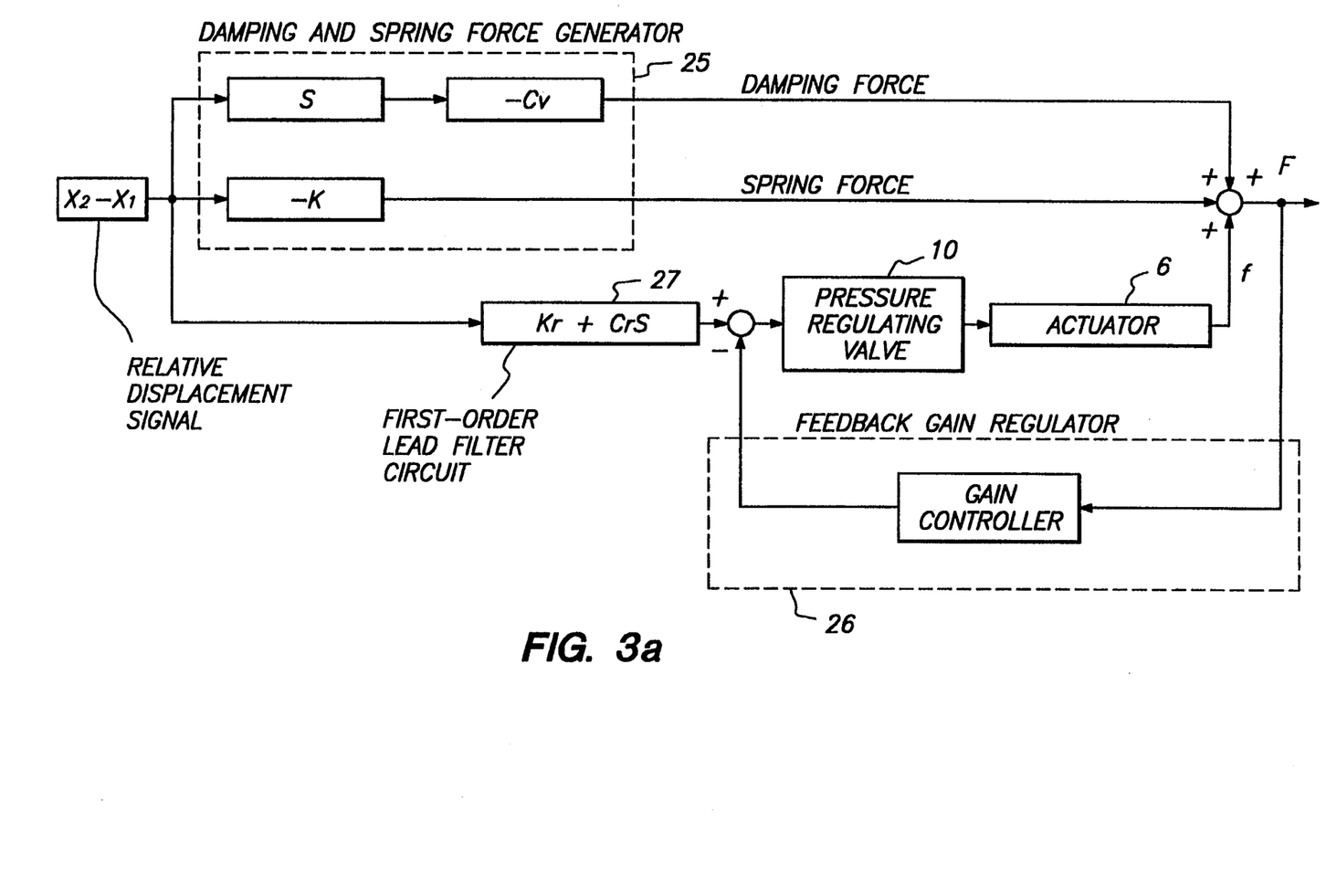
FIG. 3a is a block diagram of a modified control system according to the invention, the block diagram being substantially identical to FIG. 3 except that the box "1/m" is deleted to signify that the feedback signal is not divided by m.
Figure 4:
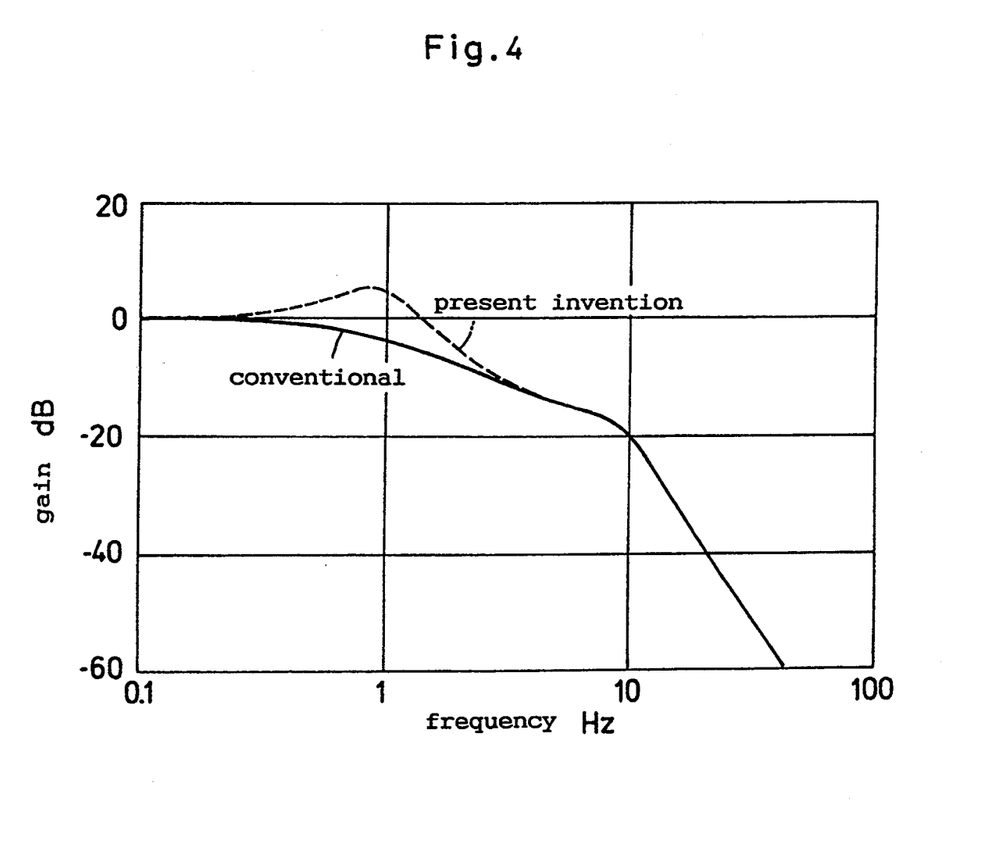
FIG. 4 is a graph showing the frequency response of the vertical displacement of the sprung mass to an input from the road surface.

According to the above described control action, some problems may arise because the damping coefficient Cv may change in a nonlinear fashion with the change in the opening stroke of the pressure regulating valve 10, and the influences of the friction in the hydraulic actuator cannot be totally eliminated while the coefficients Cr and Kr cannot be increased beyond a certain limit in order to ensure the stability of the system. Therefore, it is preferable to feedback a signal obtained by appropriately regulating the output signal from the load cell 22 provided between the suspension system and the sprung mass m with a feedback gain regulator 26 (as indicated by the part surrounded by a two-dot chain line in FIG. 3) to the control signal of the pressure regulating valve 10, so that a stable control action may be ensured. As shown in FIG. 3a, this feedback signal can also be obtained from acceleration sensor 22′ mounted on the sprung mass, and the signal need not be divided by m in this case. Further, the coefficients Cr and Kr may be varied depending on the magnitudes of the lateral acceleration and the fore-and-aft acceleration of the vehicle so that a favorable attitude control of the vehicle may be possible.

According to the control structure of the present invention, it is possible to totally eliminate the resonance peak of the sprung mass at 1 Hz that is typical to a vehicle equipped with a conventional suspension system.

In short, according to the present invention, simply by controlling the hydraulic actuator of an active vehicle suspension system according to a command signal obtained by processing a relative displacement between the vehicle body and the wheel which can be readily obtained without involving any substantial response delay with a first-order lead filter circuit, it is possible to obtain a high-compliance, low-damping vehicle suspension property which has not been possible with a conventional active or passive suspension system. Thus, the input from the road surface may be effectively shut off from the sprung mass. Furthermore, it is also possible to maintain the damping force and the spring force to such a level which ensures the capability of the wheels to maintain contact with the road surface and prevents excessive roll and other undesirable attitude properties of the vehicle body from occurring.

Although the present invention has been described in terms of a preferred embodiment thereof, it is obvious to a person skilled in the art that various alterations and modifications are possible without departing from the scope of the present invention which is set forth in the appended claims.

What we claim is:

1. An active vehicle suspension system, comprising:
   a spring interposed between a vehicle body and a wheel which is supported by said vehicle body in a vertically movable matter;
   an actuator interposed between said vehicle body and said wheel in parallel with said spring;
   a stroke sensor for detecting a relative displacement between said wheel and said vehicle body; and
   control means for controlling said actuator so as to apply a force to said vehicle body which cancels a spring force applied by said spring to said vehicle body and a damping force applied by said actuator to said vehicle body, said force being substantially proportional to a signal obtained by processing an output of said stroke sensor with a first-order lead filter circuit.

2. An active vehicle suspension system according to claim 1, further comprising a load sensor for measuring a force acting between said vehicle body and said suspension system, and a feedback circuit which substantially minimizes said force acting between said vehicle body and said suspension system according to an output from said load sensor.

3. An active vehicle suspension system according to claim 1, further comprising an acceleration sensor for measuring a vertical acceleration of said vehicle body, and a feedback circuit which substantially minimizes said vertical acceleration of said vehicle body according to an output from said acceleration sensor.

4. An active vehicle suspension system according to claim 1, further comprising low-pass filter means for removing a high frequency component from said force applied by said actuator to said vehicle body.

5. An active vehicle suspension system comprising:
   a spring interposed between a vehicle body and a wheel which is supported by said vehicle body in a vertically movable manner;
   a hydraulic actuator interposed between said vehicle body and said wheel in parallel with said spring and defining an upper chamber and a lower chamber above and below a piston thereof, respectively;
   a stroke sensor for detecting a relative displacement between said wheel and said vehicle body;
   a pressure source;
   a pressure regulating valve provided in a conduit communicating said pressure source with said upper chamber; and
   control means for controlling said pressure regulating vane so as to apply a controlled force to said vehicle body with said actuator which cancels a spring force applied by said spring to said vehicle body and a damping force applied by said hydraulic actuator to said vehicle body, said controlled force being substantially proportional to a signal obtained by processing an output of said stroke sensor with a first-order lead filter circuit.

6. An active vehicle suspension system according to claim 5, further comprising a load sensor for measuring a force acting between said vehicle body and said suspension system, and a feedback circuit which substantially minimizes said force acting between said vehicle body and said suspension system according to an output from said load sensor by acting on said pressure regulating valve.

7. An active vehicle suspension system according to claim 5, further comprising an acceleration sensor for measuring a vertical acceleration of said vehicle body, and a feedback circuit which substantially minimizes said vertical acceleration of said vehicle body according to an output from said acceleration sensor by acting on said pressure regulating valve.

8. An active vehicle suspensions system according to claim 5, further comprising a second pressure regulating valve communicating with said upper chamber of said hydraulic actuator, said second pressure regulating valve releasing a high frequency component of a pressure in said upper chamber.

9. An active vehicle suspension system according to claim 8, wherein said second pressure regulating valve consists of a popper valve having a first port directly communicating with said upper chamber, a second port communicating with said upper chamber via an orifice, and accumulator means communicating with said second port, said popper valve releasing a pressure applied to said first port according to said pressure at said first port minus a pressure at said second port.

10. A method for controlling an active vehicle suspension system comprising a spring interposed between a vehicle body and a wheel which is supported by said vehicle body in a vertically moveable manner, a hydraulic actuator interposed between said vehicle body and said wheel in parallel with said spring, a stroke sensor for detecting a relative displacement between said wheel and said vehicle body; and control means for controlling said actuator so as to apply a controlled force to said vehicle body, comprising the step of:
   applying a force produced from said actuator to said vehicle body which cancels a spring force applied by said spring to said vehicle body and a damping force applied by said hydraulic actuator to said vehicle body, said force being substantially proportional to a signal obtained by processing an output of said stroke sensor with a first-order lead filter circuit.

11. A method for controlling an active vehicle suspension system according to claim 10, further comprising the steps of measuring a force acting between said vehicle body and said suspension system with a load sensor, and substantially minimizing said force acting between said vehicle body and said suspension system with a feedback circuit according an output from said load sensor.

12. A method for controlling an active vehicle suspension system according to claim 10, further comprising the steps of measuring a vertical acceleration of said vehicle body with an acceleration sensor, and substantially minimizing said vertical acceleration of said vehicle body with a feedback circuit according an output from said acceleration sensor.

13. A method for controlling an active vehicle suspension system according to claim 10, further comprising the step of removing a high frequency component from said force applied by said actuator to said vehicle body by using low-pass filter means.

14. An active vehicle suspension system according to claim 1, including a pressure regulating valve for said actuator, and said control means utilizes said signal obtained by processing an output of said stroke sensor with a first-order lead filter circuit as a command signal for controlling said pressure regulating valve.

15. An active vehicle suspension system according to claim 5, wherein said control means utilizes said signal obtained by processing an output of said stroke sensor with a first-order lead filter circuit as a command signal for controlling said pressure regulating valve.

16. A method according to claim 10, wherein said control means utilizes said signal obtained by processing an output of said stroke sensor with a first-order lead filter circuit as a command signal for controlling a pressure regulating valve associated with said actuator.

17. An active vehicle suspension system according to claim 1, wherein said force applied by said actuator to said vehicle body is determined primarily by said signal obtained by processing an output of said stroke sensor with a first-order lead filter circuit.

18. An active vehicle suspension system according to claim 5, wherein said force applied by said actuator to said vehicle body is determined primarily by said signal obtained by processing an output of said stroke sensor with a first-order lead filter circuit.

19. A method according to claim 10, wherein said force applied by said actuator to said vehicle body is determined primarily by said signal obtained by processing an output of said stroke sensor with a first-order lead filter circuit.

* * * * *

UNITED STATES PATENT AND TRADEMARK OFFICE
CERTIFICATE OF CORRECTION

PATENT NO. : 5,390,948
DATED : February 21, 1995
INVENTOR(S) : Kuriki et al.

It is certified that error appears in the above-indentified patent and that said Letters Patent is hereby corrected as shown below:

Column 2, line 3, change "able" to --ably--.

Column 6, line 15 (claim 5, line 16), change "vane" to --valve--;
Column 6, line 38 (claim 8, line 1), change "suspensions" to --suspension--;
Column 6, line 46 (claim 9, line 3), change "popper" to --poppet--;
Column 6, line 50 (claim 9, line 7), change "popper" to --poppet--.

Column 7, line 10 (claim 11, line 7), insert --to-- after "according".

Signed and Sealed this

Ninth Day of May, 1995

*Attest:*

BRUCE LEHMAN

*Attesting Officer*  *Commissioner of Patents and Trademarks*